United States Patent
Mead et al.

[15] 3,678,751
[45] July 25, 1972

[54] THERMOMETER PROBE

[72] Inventors: Carver A. Mead, 2036 Pasadena Geln Road, Pasadena, Calif. 91107; Stephen Kurtin, 536 S. Euclid Ave., Pasadena, Calif. 91106

[22] Filed: July 1, 1970

[21] Appl. No.: 59,790

[52] U.S. Cl..................................73/362 AR, 338/28
[51] Int. Cl..................................G01k 7/22, H01c 7/04
[58] Field of Search..........................338/28; 73/362 AR

[56] References Cited

UNITED STATES PATENTS

| | | | |
|---|---|---|---|
| 3,402,378 | 9/1968 | Catlin et al. | 338/28 |
| 2,938,385 | 5/1960 | Mack et al. | 73/362 AR |
| 3,349,896 | 10/1967 | Ensign et al. | 73/362 AR X |
| 3,431,781 | 3/1969 | Wiggin | 73/362 AR |
| 3,025,706 | 3/1962 | Oppenheim | 73/362 AR |
| 3,367,186 | 2/1968 | Ensign et al. | 73/362 AR |
| 3,485,102 | 12/1969 | Glick | 73/362 AR |

*Primary Examiner*—Louis R. Prince
*Assistant Examiner*—Frederick Shoon
*Attorney*—John P. Scholl, George J. Netter and Kendrick and Subkow

[57] ABSTRACT

Extending from a handle grip is an elongated hollow metal tube with an outer open end. The interior cavity of the tube contains a quantity of foamed plastic, the outer end of which is generally conically shaped and extends beyond the open tube end. A thermistor is located at the tip of the foamed plastic cone and a thin coating of rigid cementitious material is provided over the exposed end of the plastic, metal tube and side portions of the thermistor to secure the thermistor into a fixed position. A removable plastic envelope or sheath is received over the tube and exposed thermistor, with the thermistor bottoming against the inner tube end wall.

5 Claims, 3 Drawing Figures

Patented July 25, 1972 3,678,751

INVENTORS.
CARVER A. MEAD
STEPHEN KURTIN
BY KENDRICK and SUBKOW

George J. Netter
ATTORNEYS.

THERMOMETER PROBE

The present invention relates generally to the measurement of temperature, and, more particularly, to an improved temperature measuring probe including a thermistor as an active element for taking body temperature for clinical purposes.

BACKGROUND OF THE INVENTION

In the past, the standard means for taking human body temperature has been through the use of a conventional mercury thermometer. As is well known, these thermometers not only require a relatively long period of time to register a new temperature, but also they must be shaken after each reading to reset the mercury into the bulb. Both of these requirements are manifestly disadvantageous, especially where a number of patients must have their temperatures taken periodically.

There are known faster acting electrical thermometer systems which rely upon a thermistor as the primary temperature sensing element. A thermistor is a component the electrical resistance of which varies in a known manner as a function of temperature. Typically in such systems, the thermistor has been incorporated into an electrical circuit for generating an output indication following the thermistor resistance, and thus can be calibrated to give a direct output reading of temperature.

Known thermistor probes for use in electrical temperature measuring systems are not completely satisfactory, for one reason or another. In certain known devices, the thermistor has been left exposed to direct contact with body surfaces, giving rise to a continuing problem of possible damage to the thermistor during use or cleaning after use, necessitating its replacement. In other cases, the thermistor is so constructed as to be maintained in contact with a mass of material during use whereby the reaction time of the probe is substantially lengthened.

SUMMARY OF THE INVENTION

In accordance with the practice of the present invention, there is provided an improved thermometer probe for hand held use. Extending from a handle grip is an elongated hollow metal tube with an outer open end. The interior cavity of the tube contains a quantity of foamed plastic, the outer conical end of which extends beyond the open tube end. A thermistor is located at the tip of the foamed plastic cone, with connecting wires thereto extending axially through the plastic body into the handle portion for connection to external electrical apparatus via a cable. A thin coating of rigid cementitious material is provided over the exposed end of the plastic, metal tube and side portions of the thermistor to secure the thermistor. A removable plastic envelope or sheath is received over the tube and exposed thermistor, with the thermistor bottoming against the inner tube end wall. In use, that part of the probe including the plastic covering is inserted into the appropriate body cavity in which temperature is to be taken and the thermistor is accordingly varied in resistance responsive to the temperature of the environment, which change in temperature is reflected through associated electrical apparatus to provide a direct indication of the body temperature.

DESCRIPTION OF A PREFERRED EMBODIMENT

Figure 1:
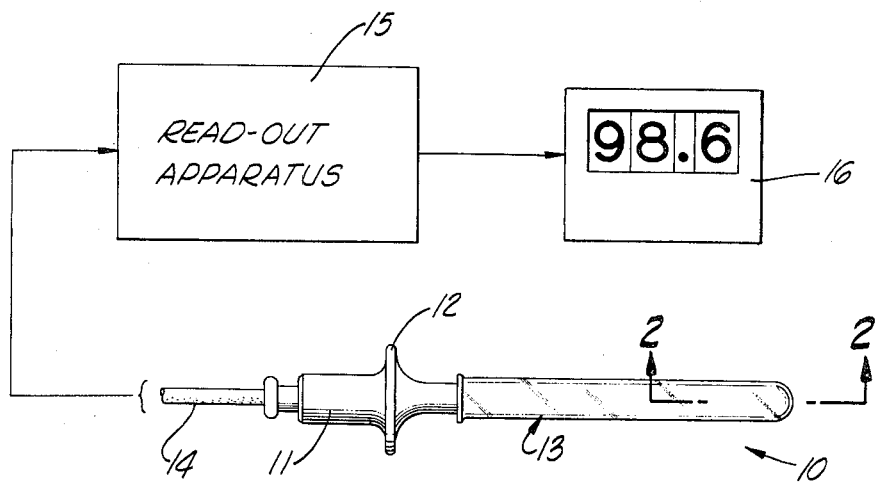
FIG. 1 is a schematic representation of the temperature measuring apparatus of the present invention.

With reference now particularly to FIG. 1 of the drawings, the temperature measuring probe 10 of the present invention is seen to comprise in its major elements a cylindrical handle 11, a flange 12 forwardly of the handle, and an elongated shaft portion 13, the latter including the temperature sensor means of a special construction to be described later herein. In use the handle 11 is held in the fingers of the nurse or attendant and the shaft portion 13 is inserted into the appropriate body cavity. The body temperature of the patient immediately surrounding the sensor enclosed within the shaft 13 produces an electrical signal change via the cabling 14 and digital readout circuit 15 which provides direct temperature display as at 16, for example.

Figure 2:
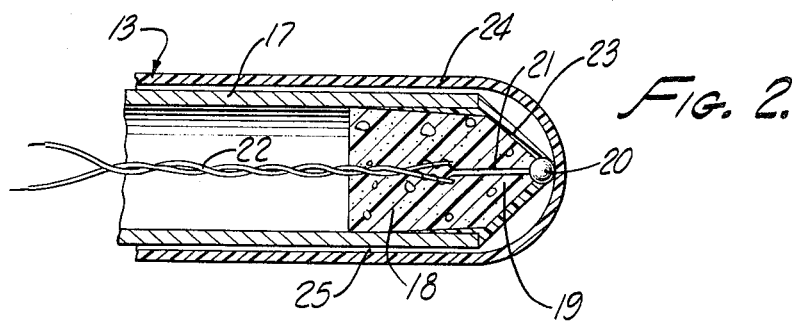
FIG. 2 is a sectional, partially fragmentary, enlarged view of the temperature probe of the present invention taken along the line 2—2 of FIG. 1.
Figure 3:
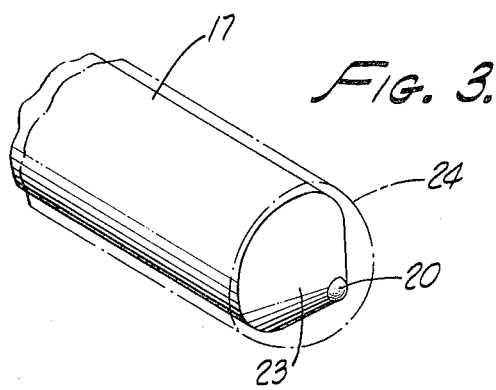
FIG. 3 is a perspective view of the probe end of the present invention showing a removable covering in phantom.

With reference now particularly to FIG. 2, the shaft portion 13 is seen to include a hollow metal cylindrical tube 17, which has the outer end portion of its central cavity filled with a body of foamed plastic 18 which extends outwardly of the tube end to terminate in a cone 19. At the cone apex, there is located a temperature responsive element 20 having the property of changing its electrical characteristics as a function of temperature. Although other temperature responsive materials may be found useful in this regard, best operation has been obtained to date with an element known as a thermistor which provides a generally exponential change of electrical resistance as a function of ambient temperature. The other end of the tube 17 is affixed to the handle portion in a suitable manner (not shown).

Attached to the thermistor 20 are a pair of fine wire leads 21 which, in turn, are connected to larger leads 22. The leads 21 and 22 may be axially threaded through the foamed plastic body 18, or a passageway may be first formed in the body by a needlelike tool, for example, after which the wires may be inserted in the passageway. The fine wire leads 21 are approximately 0.002 inches in diameter and constructed of a metal having relatively low heat conductivity such as constantan, Nichrome or stainless steel, for example, which will not draw a significant amount of heat from the thermistor and thereby leaves the thermistor more closely reflecting the true ambient temperature. The leads 22 are connected within the handle 11 to the cable 14 in a conventional manner.

A cementitious material 23 which is rigid on setting up, is applied in a thin coating over the outer surface of the cone 19 and onto the end edges of the tube 17, as well as extending along the inner surface of the tube for a limited distance. The material 23 also engages the side portions of the temperature responsive element 20 while leaving its outwardly directed surface exposed. In this way, the element 20 is integrally secured with the metal tube 17 and the foamed plastic 18 by a means which provides a poor conductive path for heat as well as a low heat mass for absorption of heat. That is, although the sensing element 20 is precisely positioned at the cone apex and firmly anchored against dislodgement, it is contacted by securing means constructed of relatively low heat conducting materials.

A disposable thin wall plastic sheath 24 is removably received over the tube 17 with its side walls spaced from the tube as at 25 and the closed end wall brought into bearing contact with the element 20 when fully seated. It is important that this sheath have a sufficiently thin wall such that the element 20 will quickly respond to the ambient temperature. That is, the sheath has the dual functions of protecting the element 20 and adjoining surfaces of the probe and also providing a rapid conduction of heat therethrough. The sheath or envelope 24 is contemplated for but a single use, after which it is removed, thrown away and a new one placed thereon for use with another patient.

In an actual construction of the invention, the foamed plastic body 18 was constructed of a urethane plastic included within a thin wall stainless steel tube 17; and the cementitious material 22 consisted of an epoxy, using a No. 4206 base with a 3490 hardener, both manufactured and sold by the Hysol Company. The probe cover or sheath was made of polyethylene having a body wall thickness of 0.007–0.010 inches.

There is provided in accordance with the practice of the present invention a thermistor probe for use in taking body temperature which is exceptionally fast acting. The thermistor mounting is isolated from all probe parts having high heat capacity whereby the thermistor can quickly reflect temperature change without the adverse reaction time effect of a proximate high heat capacity body. Moreover, since the thermistor and immediately adjacent portions of the contacting probe cover form a low heat mass, the probe may be advantageously used to take temperature measurements at parts of the body having low heat mass. For example, in taking the temperature at the back of the throat with a high heat capacity probe, the probe can withdraw sufficient heat from the low heat mass tissues to introduce a serious error in the throat surface temperature measurement.

Forming the thermistor, protruding foam plastic and metal cylinder end into an integral unit by enclosing all but the thermistor tip in a rigid coating provides an exceptionally rugged construction capable of withstanding repeated emplacement and removal of probe covers without adverse effect. In actual use, the probe covers are pushed in place and pulled or snapped off in such manner as to subject the probe tip to significant forces which, lacking the firm and durable thermistor mounting arrangement of this invention, could quickly destroy or impair probe operation.

What is claimed is:

1. A clinical thermometer probe for use with external electrical processing and display apparatus, comprising:
    handle means;
    a hollow metal tube having one end affixed to the handle means;
    a foam plastic plug received within the other end of the tube and having generally conical portions protruding from said tube end;
    a thermistor mounted to the outer end surface of the plug;
    a thin coating of a rigid, low heat conducting material adhered to the tube, protruding plug portions and parts of the thermistor; and
    a removable thin wall plastic cover received over said thermistor, plug and tube, said cover being maintained spaced from said tube throughout and having a closed end which is in bearing contact with the thermistor.

2. A clinical body temperature sensing probe for use with electrical measuring apparatus, comprising, in combination:
    handle means;
    a hollow open-ended tube having one end affixed to the handle means;
    a body of low heat capacity material included within the other end of the tube and extending outwardly therefrom;
    heat responsive means mounted onto an outwardly directed surface of said low heat capacity body, said heat responsive means exhibiting an electrical characteristic of value functionally related to its temperature;
    means interconnecting the heat responsive means and the electrical measuring apparatus;
    a thin film of rigid low heat capacity material unitarily joining the tube, body of low heat capacity material and the heat responsive means; and
    a low heat capacity, hollow tube shield having an open end and a closed end, said open end being received over the end of the tube and removably retained on said handle means, and said closed end being in contacting relation with the heat responsive means.

3. A clinical temperature probe as in claim 2, in which the heat responsive means includes a thermistor mounted on an outwardly directed surface of the body of low heat capacity material and having an exposed surface free of the coating.

4. A clinical temperature probe as in claim 2, in which the body of low heat capacity material includes a foamed plastic plug fittingly received within the end of the hollow tube.

5. A clinical temperature sensing probe for connection with electrical measuring apparatus, comprising:
    a handle;
    a hollow, open-ended metal tube having one end secured to the handle and extending outwardly therefrom;
    a plastic foam plug received within the other end of the tube and having a tapered portion extending outwardly of the tube;
    a thermistor mounted onto the outer end surface of the plug tapered portion;
    a thin film of epoxy over the plug tapered portion, tube end and parts of the thermistor integrally securing the same;
    lead wire means connected to the thermistor and extending through the plug, tube and handle for interconnection with the measuring apparatus; and
    an elongated, thin-wall tubular plastic shield having an open end frictionally retained to handle, the side walls of which shield are maintained spaced from the tube, and a closed end wall which contacts the thermistor.

* * * * *